(12) United States Patent
Santini

(10) Patent No.: US 6,763,631 B1
(45) Date of Patent: Jul. 20, 2004

(54) FISHING LURE

(76) Inventor: Peter B. Santini, 90 Main St., Everett, MA (US) 02194

( * ) Notice: Subject to any disclaimer, the term of this patent is extended or adjusted under 35 U.S.C. 154(b) by 0 days.

(21) Appl. No.: 10/421,064

(22) Filed: Apr. 23, 2003

(51) Int. Cl.$^7$ ............................................. A01K 85/00
(52) U.S. Cl. ................... 43/42.36; 43/42.06; 43/42.19; 43/42.24; 43/42.39
(58) Field of Search ........................... 43/42.36, 42.39, 43/42.05, 42.06, 42.19, 42.24

(56) References Cited

U.S. PATENT DOCUMENTS

| | | | |
|---|---|---|---|
| 396,246 A | | 1/1889 | Vom Hope |
| 889,804 A | * | 6/1908 | Pflueger ..................... 43/42.36 |
| 1,561,512 A | * | 11/1925 | Fredricks ..................... 43/42.36 |
| 1,708,825 A | * | 4/1929 | Barclay ..................... 43/42.36 |
| 2,091,457 A | * | 8/1937 | Sauer ..................... 43/42.06 |
| 2,261,549 A | * | 11/1941 | Hayes ..................... 43/42.36 |
| 2,475,101 A | * | 7/1949 | Kosach ..................... 43/42.36 |
| 2,797,517 A | * | 7/1957 | Eriksen ..................... 43/42.06 |
| 3,157,959 A | * | 11/1964 | Anderson ..................... 43/42.39 |
| 3,221,436 A | * | 12/1965 | Mikus ..................... 43/42.36 |
| 3,440,756 A | * | 4/1969 | Leadbetter ..................... 43/42.36 |
| 3,680,249 A | * | 8/1972 | Chiarenza ..................... 43/42.06 |
| 3,758,976 A | * | 9/1973 | Szwolkon ..................... 43/42.24 |
| 3,965,606 A | * | 6/1976 | Bingler ..................... 43/42.24 |
| 3,991,504 A | | 11/1976 | Pieper |
| 4,054,004 A | * | 10/1977 | Schott ..................... 43/42.06 |
| 4,133,134 A | * | 1/1979 | Cheng ..................... 43/42.06 |
| 4,208,822 A | * | 6/1980 | Bryant ..................... 43/42.24 |
| 4,211,027 A | | 7/1980 | Viscardi |
| 4,253,263 A | | 3/1981 | Franklin et al. |
| 4,858,368 A | * | 8/1989 | Tolner et al. ..................... 43/42.36 |
| 4,914,851 A | * | 4/1990 | Acker ..................... 43/42.05 |
| 5,142,811 A | | 9/1992 | Freeman |
| 5,299,378 A | * | 4/1994 | Ballard ..................... 43/42.06 |
| 5,548,920 A | * | 8/1996 | Peddycoart ..................... 43/42.24 |
| 5,560,140 A | * | 10/1996 | Nafziger et al. ..................... 43/42.36 |
| 5,894,693 A | * | 4/1999 | Davie ..................... 43/42.24 |
| D410,063 S | | 5/1999 | Farina |

FOREIGN PATENT DOCUMENTS

| | | | | |
|---|---|---|---|---|
| FR | 85156 B1 | * | 5/1965 | ..................... 43/42.24 |
| NO | 94124 B1 | * | 6/1959 | ..................... 43/42.24 |
| NO | 95396 B1 | * | 1/1960 | ..................... 43/42.24 |
| NO | 96277 B1 | * | 6/1960 | ..................... 43/42.24 |
| NO | 117888 B1 | * | 10/1969 | ..................... 43/42.24 |

* cited by examiner

*Primary Examiner*—Darren W. Ark
(74) *Attorney, Agent, or Firm*—Pandiscio & Pandiscio

(57) ABSTRACT

A fishing lure includes a wire strand having a connector at a first end thereof for connection to a fishing line, and a fish hook at a second end thereof. A flexible tube is mounted on the strand with a first end disposed proximate the connector, and a second end open and disposed proximate the hook. The tube has a hole in a side thereof spaced from the tube second end, the hole being sized and configured for free inflow of water therethrough and into the tube. A sinker is mounted on the strand and is lodged in the first end of the tube to close off the first end of the tube, such that the tube is open only at the hole and the second end. Upon moving of the tube through water, water enters the hole and turbulently exits the tube second end adjacent the hook.

18 Claims, 1 Drawing Sheet

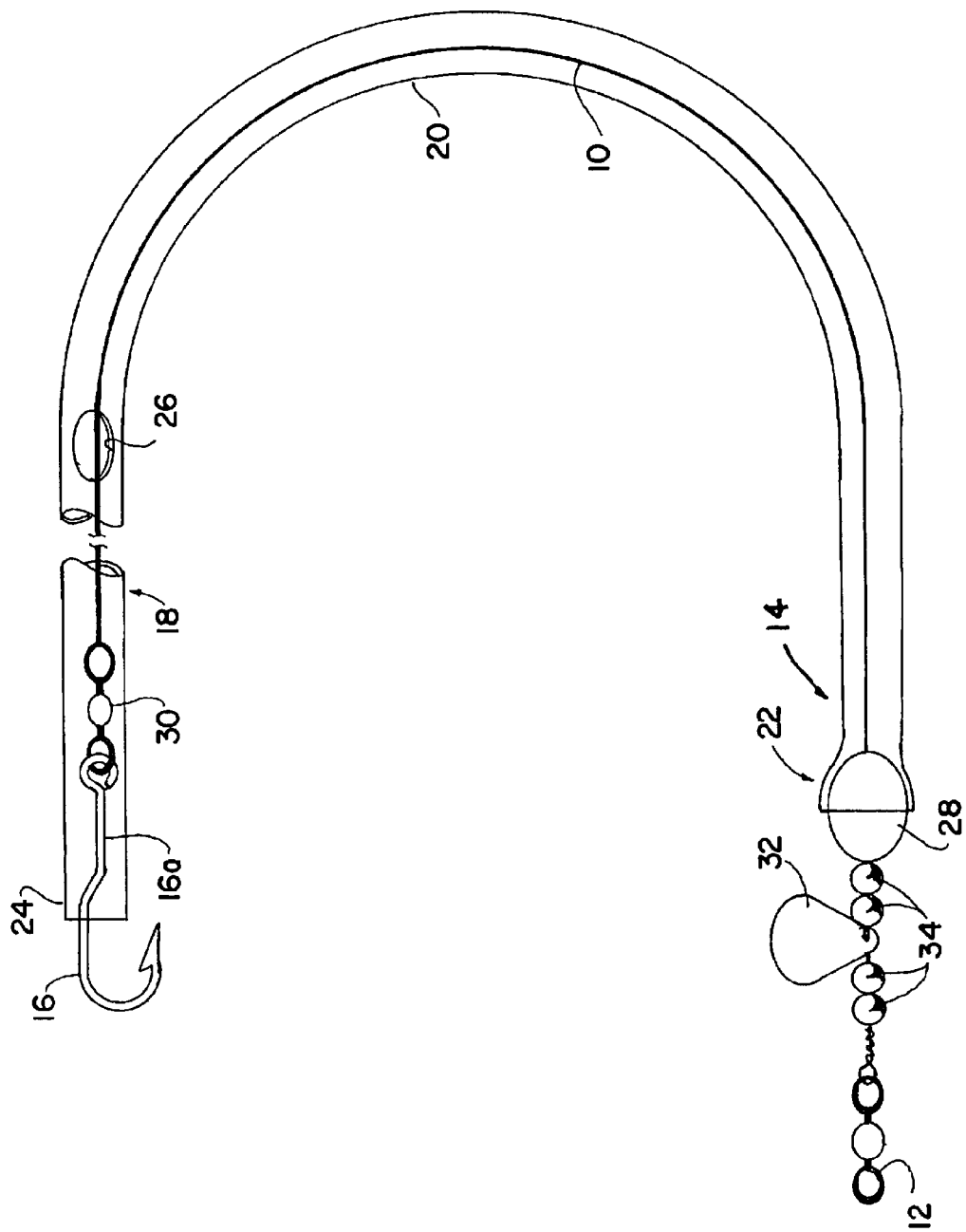

FISHING LURE

BACKGROUND OF THE INVENTION

1. Field of the Invention

The invention relates to fishing lures and is directed more particularly to an active, animated lure.

2. Description of the Prior Art

Fishing lures in which a wire passes through a flexible tubular member are generally known.

In U.S. Pat. No. 396,246, issued Jan. 15, 1889 to E.C. Vom Hofe, there is shown a fishing line immovably fixed within a piece of rubber tubing. The object of the arrangement was to catch tarpon but not sharks.

In U.S. Pat. No. 3,991,504, issued Nov. 16, 1976 to Curtis A. Pieper, there is disclosed a fishing line passing through a sleeve having a multitude of openings along its length for dispensing bait material from the sleeve.

In U.S. Pat. No. 4,211,027, issued Jul. 8, 1980 to Francis N. Viscardi, a fishing lure is shown and described which includes a fishing line passing through a tubular member which has been cut helically throughout its length. Water flowing through the adjacent coils of the helix are said to cause the lure to wiggle and cause bubbles to form, which were believed to attract bluefish.

U.S. Pat. No. 5,142,811, issued Sep. 1, 1992 to Carl W. Freeman, presents a lure including a tube having a fishing line therein with a hook on one end of the fishing line and extending out an after end of the tube. The tube has both an open forward end and an open after end. The forward end can be selectively sized to meter the flow of the water therethrough, which is said to generate a fish attracting noise.

While the above and other similar lures appear to provide advantages to fishermen, there is a continuing quest for improved lures having fish attracting capabilities.

SUMMARY OF THE INVENTION

An object of the invention is, therefore, to provide an improved lure which, in use, exhibits active, animated conditions and movements.

With the above and other objects in view, a feature of the invention is the provision of a fishing lure comprising an elongated wire strand having a connector at a first end thereof and adapted for connection to a fishing line, and a fish hook at a second end thereof. A flexible tube is mounted on the strand, a first end of the tube being disposed proximate the connector, and a second end of the tube being open and disposed proximate the hook. The tube is provided with a hole in a side thereof spaced from the tube second end by no more than about 21 times an inside diameter of the tube, the hole being sized and configured for free inflow of water therethrough and into the tube. A sinker is mounted on the strand proximate the connector and lodged in the first end of the tube to close off the first end of the tube, such that the tube is open only at the hole and the second end. Upon moving of the tube through water with the tube second end trailing, water enters the hole and turbulently exits the tube second end adjacent the hook.

In accordance with a further feature of the invention, there is provided a fishing lure comprising a wire strand of about 24 inches in length, the strand comprising two 60 lb. stainless steel wires, each of about 0.028 inch diameter, twisted together by about eight twists per inch of wire strand, and a flexible tube of about 24 inches in length and ⅜ inch inside diameter mounted on the strand, the tube being closed at a forward end thereof, open at an after end thereof from which a hook extends, and having a hole therein of a generally oval configuration on a side of the tube and about one inch long and ½ inch wide, the hole being spaced from the open after end of the tube by about seven inches. Upon drawing the lure through water, water enters the hole and exits in bubbly fashion from the tube open after end proximate the hook, the inflow of water moving the after end of the lure transversally and the wire reacting to the transverse movement to counter with opposite transverse movement to provide an undulating motion of the lure through the water.

The above and other features of the invention, including various novel details of construction and combinations of parts, will now be more particularly described with reference to the accompanying drawings and pointed out in the claims. It will be understood that the particular device embodying the invention is shown by way of illustration only and not as a limitation of the invention. The principles and features of this invention may be employed in various and numerous embodiments without departing from the scope of the invention.

BRIEF DESCRIPTION OF THE DRAWING

Reference is made to the accompanying drawing in which is shown an illustrative embodiment of the invention, from which its novel features and advantages will be apparent.

The drawing is a partly sectional, partly elevational view of one form of lure illustrative of an embodiment of the invention.

DESCRIPTION OF THE PREFERRED EMBODIMENTS

Referring to the drawing, it will be seen that the illustrative fishing lure includes an elongated wire strand 10 having a connector 12 at a first end 14 thereof. The connector 12 is adapted for connection to a fishing line (not shown), such as the lines commonly mounted on reels of casting rods. A fish hook 16 is mounted on the strand 10 at a second end 18 of the strand.

A flexible tube 20, preferably of PVC, or the like, is mounted on the strand. A first end 22 of the tube 20 is disposed proximate the connector 12 and a second end 24 of the tube 20 is disposed proximate the hook 16. The second end 24 of the tube 20 is open.

The tube 20 is provided with a hole 26 in a side of the tube and is spaced from the tube second end 24 by no more than about 21 times an inside diameter of the tube. The hole 26 is sized and configured for free flow of water therethrough and into the tube when the lure is moved through the water with the first end 22 forward and leading, and the second end 24 aft and trailing.

A sinker 28 is mounted on the strand 10 proximate the connector 12 and is lodged in the first end 22 of the tube 20 to close off the first end of the tube. Thus, the tube 20 is open only at the hole 26 and the tube after end 24.

Upon moving of the lure through the water, as aforesaid, the water entering the tube 20 through the hole 26 is in a turbulent state and exits the tube after end, near the hook 16, in a turbulent, bubbly state, which attracts fish to the area of the hook.

In addition, the inflowing water entering on one side of the tube 20, tends to move the tube transversely to the length of the tube. The strand, while generally flexible, is sufficiently rigid to counteract the water-imposed sidewise translation and to bend the lure back in opposition to the incoming water, to provide a generally undulating motion of the lure, which adds to the attractiveness of the lure for fish.

It has been found that the size of the hole 26 and the distance of the hole from the after end 24 are critical factors in the lure. The length of the hole is about 0.04 times the length of the tube and the width of the hole is about 0.02 times the length of the tube. The lure hole 26 should be spaced from the tube after end 24 by at least about 11 times the inside diameter of the tube, but no more than about 21 times the inside diameter of the tube. Such spacing appears to provide the necessary turbulence at the tube after end in the vicinity of the hook, and also to provide the correct transverse pressure on the trailing portion of the lure to obtain the desired undulation of the lure.

It is preferred that the after end 24 of the tube 20 extends over a portion 16a of the hook 16. Preferably, the connector 12 is a swivel connector and the hook 16 is attached to the strand 10 by a second swivel connector 30. Traditional fish lure items may be mounted on the strand 10, such as a spinner 32, which may also serve as a "clicker", and beads 34 of selected colors and sizes.

In one preferred embodiment, the lure includes a tube of about 24 inches in length covering a wire strand of about 20 inches in length. The tube has an inside diameter of about 0.375 inch and an outside diameter of about 0.5 inch. The sinker 28 is a 0.5 oz. lead sinker. The hole 26 is disposed 4–8 inches from the second end 24 of the tube, preferably about 7 inches. The hole 26 is oval shaped and is about one inch long and about 0.5 inch wide.

In the preferred embodiment, the wire strand includes two 60 lb. stainless steel wires, each of about 0.028 inch diameter, twisted together by about eight twists per inch of the strand length.

There is thus provided an improved lure which, in use, exhibits active, animated motions attractive to fish.

It is to be understood that the present invention is by no means limited to the particular construction herein disclosed and/or shown in the drawings, but also comprises any modification or equivalent within the scope of the claims.

What is claimed is:

1. A fishing lure comprising:
   an elongated wire strand having a connector at a first end thereof and adapted for connection to a fishing line, and having a fish hook at a second end thereof, said strand being sufficiently flexible to be moved transversely to an axis thereof by water pressure thereon, and sufficiently rigid to seek to return to an axial position upon diminution of the water pressure thereon;
   a flexible tube mounted on said strand, a first end of said tube being disposed proximate the connector, and a second end of said tube being wholly open and disposed proximate the hook, said tube having an oval shaped orifice in a side thereof spaced from the tube second end by 11–21 times an inside diameter of said tube, the transverse width of the orifice being less than the transverse width of said tube, the orifice being sized for free inflow of water therethrough and into the tube; and
   a sinker mounted on said strand proximate the connector and lodged in the first end of said tube to close off the first end of said tube, such that said tube is open only at the orifice and the second end, the second end of said tube extending over only a portion of the hook;
   whereby upon moving of said tube through water with the tube second end trailing, water enters the orifice and impinges against said strand and against a portion of said tube opposite from said orifice, and turbulently exits the tube second end adjacent the hook.

2. A fishing lure comprising:
   a wire strand of about 20 inches in length, said strand comprising two 60 lb. stainless steel wires, each of about 0.028 inch diameter, twisted together by about eight twists per inch of wire strand, and
   a flexible tube of about 24 inches in length and about ⅜ inch inside diameter mounted on said strand, said tube being closed at a forward end thereof, open at an after end thereof from which a hook extends, and having a hole therein of a generally oval configuration on a side of said tube and about one inch long and ½ inch wide, the hole being spaced from the open after end of said tube by about seven inches;
   wherein upon drawing the lure through water, water enters the hole and exits in bubbly fashion from the tube open after end proximate the hook, the inflow of water moving the after end of the lure transversally and the strand reacting to the transverse movement to counter with opposite transverse movement to provide an undulating motion of the lure through the water.

3. A fishing lure comprising:
   an elongated wire strand having a connector at a first end thereof and adapted for connection to a fishing line, and a fish hook at a second end thereof, wherein said strand comprises two 60 lb. stainless steel wires, each of about 0.028 inch diameter, twisted together by about eight twists per inch of strand length;
   a flexible tube mounted on said strand, a first end of said tube being disposed proximate the connector, and a second end of said tube being open and disposed proximate the hook, said tube having a hole in a side thereof spaced from the tube second end by no more than about 21 times an inside diameter of said tube, the hole being sized and configured for free inflow of water therethrough and into the tube; and
   a sinker mounted on said strand proximate the connector and lodged in the first end of said tube to close off the first end of said tube, such that said tube is open only at the hole and the second end;
   whereby upon moving of said tube through water with the tube second end trailing, water enters the hole and turbulently exits the tube second end adjacent the hook.

4. The lure in accordance with claim 3 wherein the hole is spaced from the tube second end by at least about 11 times the inside diameter of said tube.

5. The lure in accordance with claim 4 wherein the hole is generally oval shaped and is of a length of about 0.04 times the length of the tube and of a width of about 0.02 times the length of the tube.

6. The lure in accordance with claim 5 wherein the second end of said tube extends over a portion of the hook.

7. The lure in accordance with claim 5 wherein the connector for connection to a fishing line comprises a first swivel connector.

8. The lure in accordance with claim 7 wherein the hook is connected to the strand second end by a second swivel connector.

9. The lure in accordance with claim 7 wherein between said first swivel connector and said sinker is a spinner mounted on said strand.

10. The lure in accordance with claim 9 wherein the spinner comprises a clicker.

11. The lure in accordance with claim 9 wherein mounted on said strand on either side of the spinner are beads of selected colors and sizes.

12. The lure in accordance with claim 5 wherein said tube is about 24 inches long and of about 0.375 inch inside diameter.

13. The lure in accordance with claim 12 wherein said sinker is of lead and weighs about ½ ounce.

14. The lure in accordance with claim 12 wherein the hole is disposed about 4–8 inches from the second end of said tube.

15. The lure in accordance with claim 14 wherein the hole is disposed about 7 inches from the second end of said tube.

16. The lure in accordance with claim 15 wherein the hole is generally oval shaped and is about 1 inch long and about ½ inch wide.

17. A fishing lure comprising:

an elongated wire strand having a connector at a first end thereof and adapted for connection to a fishing line, and a fish hook at a second end thereof, wherein said strand comprises two 60 lb. stainless steel wires, each of about 0.028 inch diameter, twisted together by about eight twists per inch of strand lengths;

a flexible tube mounted on said strand, a first end of said tube being disposed proximate the connector, and a second end of said tube being open and disposed proximate the hook, said tube having a hole in a side thereof spaced from the tube second end by no more than about 11–21 times an inside diameter of said tube, the hole being sized and configured for free inflow of water therethrough and into the tube, the hole being generally oval shaped and of a length of about 0.04 times the length of the tube and of a width of about 0.02 times the length of the tube;

a sinker mounted on said strand proximate the connector and lodged in the first end of said tube to close off the first end of said tube, such that said tube is open only at the hole and the second end;

whereby upon moving of said tube through water with the tube second end trailing, water enters the hole and turbulently exits the tube second end adjacent the hook.

18. In a fishing lure comprising:

a wire strand of about 20 inches in length having a connector at a first end thereof and adapted for connection to a fishing line, and a fish hook at a second end thereof;

a flexible tube of about 24 inches in length and of about ½ inch outside diameter mounted on said strand, a first end of said tube being disposed proximate the connector, and a second end of said tube being open and disposed proximate the hook, said tube having a hole in a side thereof spaced from the tube second end by no more than about 8 inches, the hole being sized and configured for free inflow of water therethrough and into the tube; and a sinker mounted on said strand proximate the connector and lodged in the first end of said tube to close off the first end of said tube, such that said tube is open only at the hole and the second end;

whereby upon moving of said tube through water with the tube second end trailing, water enters the hole and turbulently exits the tube second end adjacent the hook;

an improvement wherein said elongated wire strand comprises two 60 lb. stainless steel wires, each of about 0.028 inch diameter, twisted together by about eight twists per inch of strand length;

whereby said wire strand and said flexible tube exhibit an undulating motion as the lure is moved through the water.

* * * * *